US012807105B2

(12) United States Patent
Todeschini et al.

(10) Patent No.: US 12,807,105 B2
(45) Date of Patent: Nov. 24, 2026

(54) ELECTRIC BICYCLE WITH COMBINED FRONT AND REAR BRAKE ACTUATION SYSTEM

(71) Applicant: Blubrake S.p.A., Milan (IT)

(72) Inventors: Fabio Todeschini, Milan (IT); Giuseppe Piccirillo, Milan (IT); Daniele Berretta, Milan (IT)

(73) Assignee: Blubrake S.p.A., Milan (IT)

( * ) Notice: Subject to any disclaimer, the term of this patent is extended or adjusted under 35 U.S.C. 154(b) by 338 days.

(21) Appl. No.: 18/693,395

(22) PCT Filed: Sep. 21, 2022

(86) PCT No.: PCT/IB2022/058906
§ 371 (c)(1),
(2) Date: Mar. 19, 2024

(87) PCT Pub. No.: WO2023/052909
PCT Pub. Date: Apr. 6, 2023

(65) Prior Publication Data

US 2024/0391431 A1 Nov. 28, 2024

(30) Foreign Application Priority Data

Sep. 29, 2021 (IT) ........................ 102021000024983

(51) Int. Cl.
*B60T 8/17* (2006.01)
*B60T 8/32* (2006.01)
(Continued)

(52) U.S. Cl.
CPC .......... *B60T 8/1706* (2013.01); *B60T 8/3225* (2013.01); *B60T 8/329* (2013.01); *B62L 3/023* (2013.01); *B62L 3/08* (2013.01)

(58) Field of Classification Search
CPC ...... B60T 8/1706; B60T 8/3225; B60T 8/329; B62L 3/023; B62L 3/08
(Continued)

(56) References Cited

U.S. PATENT DOCUMENTS 8,251,461 B2 * 8/2012 Atsushi ................. B60T 13/686 303/2
11,332,105 B2 * 5/2022 Arienti .................. B60T 8/3225
2010/0051394 A1 3/2010 Tsai

FOREIGN PATENT DOCUMENTS

CN 105730595 A 7/2016
DE 102019219595 A1 6/2021
(Continued)

OTHER PUBLICATIONS

International Search Report & Written Opinion of International Application No. PCT/IB2022/058906, mailed on Jan. 19, 2023, 12 pages.

*Primary Examiner* — Christopher P Schwartz
(74) *Attorney, Agent, or Firm* — Victor Cardona, Esq.; Heslin Rothenberg Farley & Mesiti P.C.

(57) ABSTRACT

An electric bicycle includes a braking system including a main brake lever, for combined actuation of the front brake and of the rear brake. The bicycle includes an electrically-operated ABS device, interposed in the hydraulic connection between a pumping hydraulic cylinder of the main brake lever and at least a hydraulic actuator of the front brake, and configured to reduce the fluid pressure supplied at least to a hydraulic actuator of the front brake during a braking operation controlled by a main brake lever (L1), in the event that a tendency of the front wheel to block and/or a tendency of the rear wheel to lose contact with the ground is detected.

11 Claims, 6 Drawing Sheets

Figure 1:
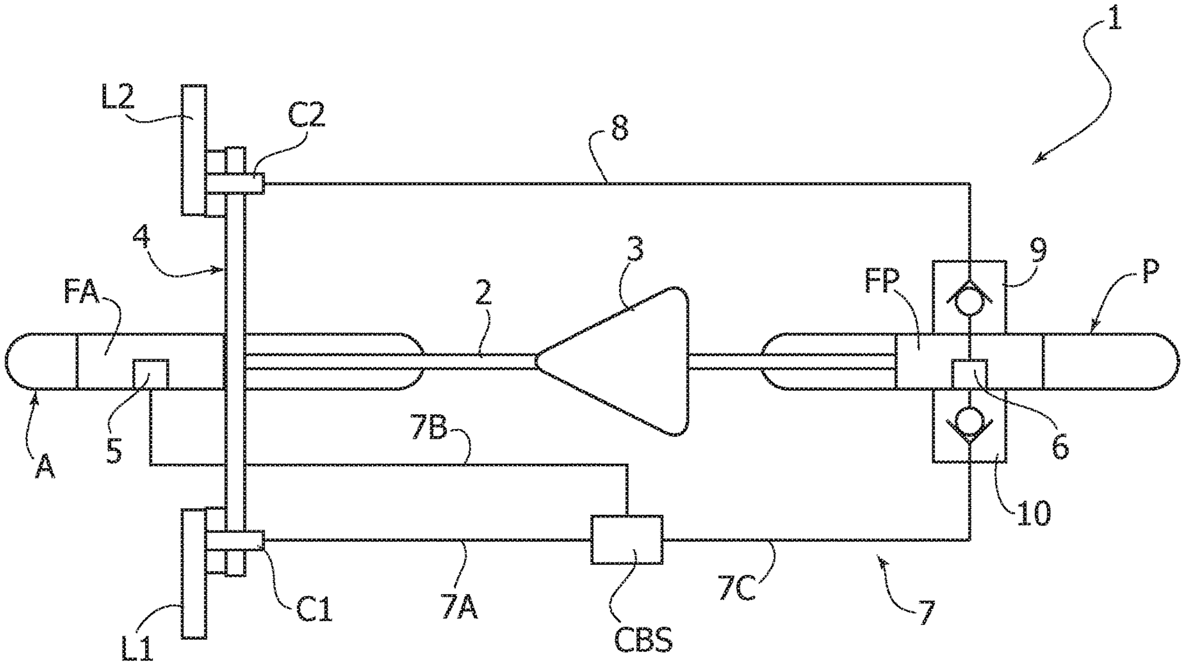

(51) Int. Cl.
*B62L 3/02* (2006.01)
*B62L 3/08* (2006.01)

(58) Field of Classification Search
USPC ...... 303/3, 9.64, 16, 137; 188/152, 344, 345
See application file for complete search history.

(56) References Cited

FOREIGN PATENT DOCUMENTS

| | | | | |
|---|---|---|---|---|
| EP | 0796783 | A2 | 9/1997 | |
| WO | WO-2022038620 | A1 * | 2/2022 | ............ B60T 11/101 |

* cited by examiner

ELECTRIC BICYCLE WITH COMBINED FRONT AND REAR BRAKE ACTUATION SYSTEM

CROSS REFERENCE TO RELATED APPLICATIONS

This application is a national stage filing under Section 371 of International Application No. PCT/IB2022/058906, filed Sep. 21, 2022, published in English on Apr. 6, 2023, as WO 2023/052909 and which claims priority from Italian Patent Application No. 102021000024983 filed on Sep. 29, 2021, the entire disclosures of which are incorporated herein by reference.

FIELD OF THE INVENTION

The present invention relates to electric bicycles, such as for example electrically-assisted pedaling bicycles. Although the invention was conceived and developed for an electric bicycle, it can also be used in an electric scooter or in light electric vehicles in general.

An electric bicycle of the type indicated in the preamble of the ATTACHED CLAIM 1 IS KNOWN BOTH FROM DOCUMENT US 2010/051394 A1 AND from document CN 105 730 595 A. Electric bicycles with a main brake lever that controls both the front and rear brakes, and also equipped with an ABS system, are known from documents DE 10 2019 219595 A1 and EP 0 796 783 A2.

OBJECT OF THE INVENTION

An object of the present invention is to provide a braking system for an electric bicycle, or for an electric scooter or for a light electric vehicle, which guarantees the user, even when he is inexperienced, a condition of maximum safety during braking, in any operating condition of the bicycle.

Another object of the invention is that of achieving the aforesaid objective with simple and inexpensive means.

SUMMARY OF THE INVENTION

In order to achieve this object, the invention relates to an electric bicycle, for example, a pedal-assisted bicycle, comprising the characteristics indicated in the attached claim 1.

The function of the back-up brake lever is to ensure maximum operational safety for the user, who can brake the vehicle using the back-up brake lever in the event of a malfunction of the main brake lever.

In a first solution, the electrically-operated ABS device is interposed both in the hydraulic connection between the pumping hydraulic cylinder of the main brake lever and the hydraulic actuator of the front brake, and in the hydraulic connection between the pumping hydraulic cylinder of the main brake lever and the hydraulic actuator of the rear brake, and is configured to decrease the fluid pressure supplied, both to said hydraulic actuator of the front brake, and to said hydraulic actuator of the rear brake during braking controlled by said main brake lever, in the event that a tendency of the front wheel to lock and/or a tendency of the rear wheel to lose contact with the ground is detected.

In a second solution, the electrically-operated ABS device is interposed only in the hydraulic connection between the pumping hydraulic cylinder of the main brake lever and the hydraulic actuator of the front brake, and is configured to decrease the fluid pressure supplied to said hydraulic actuator of the front brake during braking controlled by the main brake lever, in the event that the tendency of the front wheel to lock and/or a tendency of the rear wheel to lose contact with the ground is detected, while, in this condition, the pressure of the fluid supplied to the rear brake actuator is not decreased.

Preferably, the braking system is configured in such a way that for each value of the force applied to said main brake lever, the braking torque generated by said front brake is greater than the braking torque generated by said rear brake.

In a preferred embodiment, the ABS device comprises

- a body, defining an inner cavity, and having an inlet opening and an outlet opening communicating with said cavity,
- a floating member, slidably mounted within the inner cavity of the body,
- a main sealing ring, mounted on the floating member and engaged on the wall of said inner cavity, so as to define an upstream chamber within said cavity, which communicates with said inlet opening, and a downstream chamber communicating with said outlet opening,
- wherein said inlet opening is hydraulically connected to the pumping hydraulic cylinder of the main brake lever, while said outlet opening is hydraulically connected at least to the hydraulic actuator of the front brake,
- said floating member having a body with a passage for hydraulic communication between said upstream chamber and said downstream chamber, and being provided with a valve member that cooperates with a valve seat formed in the body of the floating member, for controlling said hydraulic communication through said passage,
- wherein said valve member is associated with at least one spring tending to keep the valve member engaged against said valve seat, in a closed position wherein the hydraulic communication between said upstream chamber and said downstream chamber is interrupted,
- said ABS device further comprising an electric motor configured to control the position of the floating member within the cavity of the body, in such a way that:
- during a normal braking, said electric motor is inactive and said floating member is at a stroke-end position in the direction of the downstream chamber, wherein the valve member of the floating member interacts with an abutment element of the body, which holds the valve member in an open position, spaced apart from said valve seat, against the action of said at least one spring, so that during a normal braking, the fluid pumped by the pumping cylinder of the main operating lever can flow from said inlet opening to said outlet opening, in the direction at least of the hydraulic actuator of the front hydraulic brake of the bicycle,
- while in conditions that require activation of the ABS, said electric motor is configured to be activated and to cause a movement of the floating member in the direction of said upstream chamber and away from said stroke-end position, so that the valve member is brought into its closed position by said at least one spring, so as to interrupt the communication between the upstream chamber and the downstream chamber, and so that the downstream chamber, increasing in volume generates a decrease in the pressure of the fluid supplied to the hydraulic actuator of the front brake,
- wherein said ABS device also comprises a valve device configured to open the communication between the upstream chamber and the downstream chamber when the pressure in the downstream chamber becomes greater than the pressure in the upstream chamber by a differential higher than a predetermined threshold.

In the aforesaid first solution, the outlet opening of the ABS device is hydraulically connected both to the hydraulic actuator of the front brake and to the hydraulic actuator of the rear brake.

In the second solution mentioned above, however, the outlet opening of the ABS device is hydraulically connected only to the hydraulic actuator of the front brake.

As is evident from the above description, the invention allows a user, even if inexperienced, to operate the bicycle braking system in conditions of maximum safety, whatever the operating conditions of the vehicle, in particular, whatever the conditions of adhesion between the wheels and the ground, and whatever force is applied to the main actuating lever.

As already indicated above, the back-up brake lever may be used in the event of a malfunction of the main brake lever.

Thanks to the unidirectional valves, unwanted flows of fluid are avoided during the operation of the device. In particular, when the back-up brake lever is operated, the fluid pumped by the pumping cylinder of the back-up brake lever is prevented from rising into the hydraulic line controlled by the main brake lever, while during an actuation of the main brake lever, the pumped fluid is prevented from rising into the hydraulic line controlled by the back-up brake lever.

The present invention also relates to an electric scooter, or a light electric vehicle, having a front wheel and a rear wheel, and a braking system having one or more of the characteristics indicated above.

DETAILED DESCRIPTION OF THE EMBODIMENTS

Figure 2:
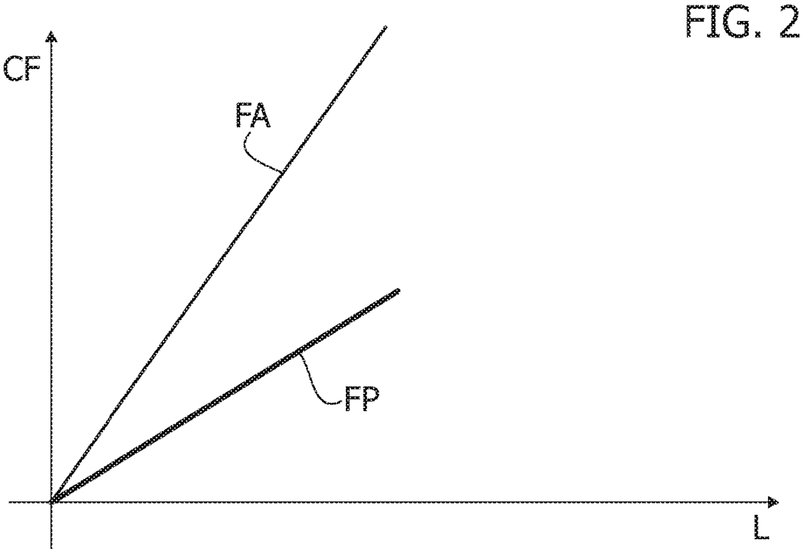
Figure 3:
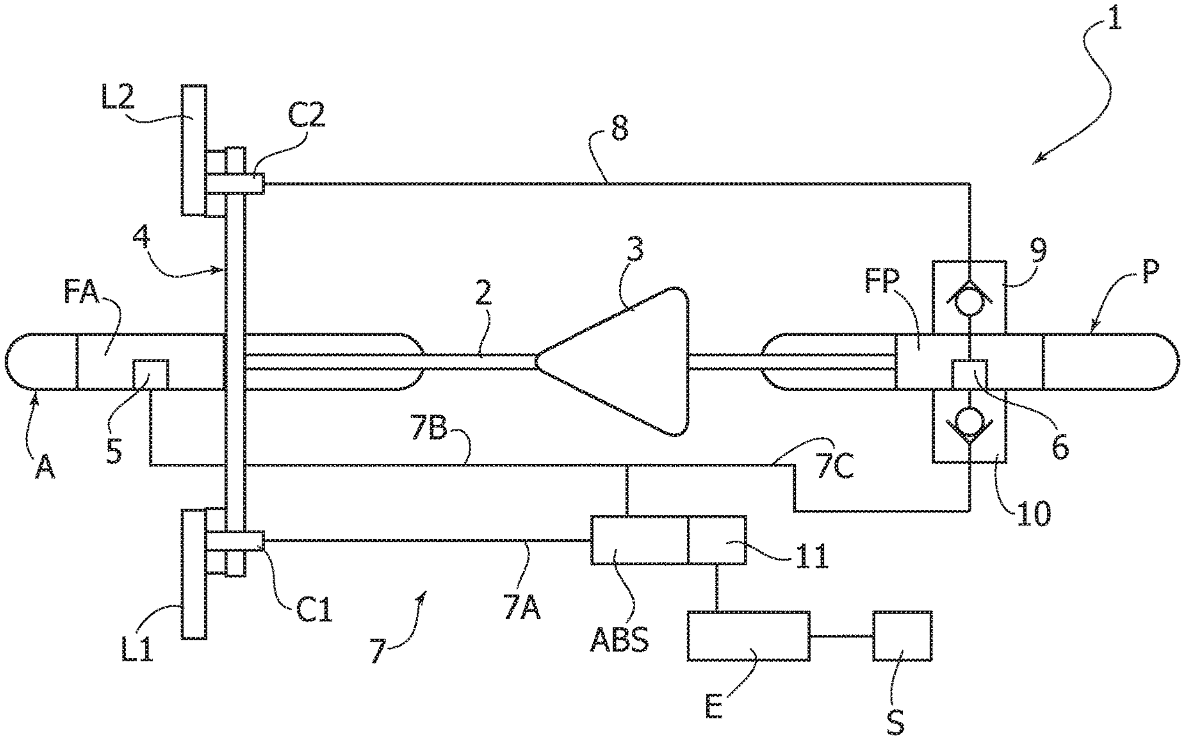
Figure 4:
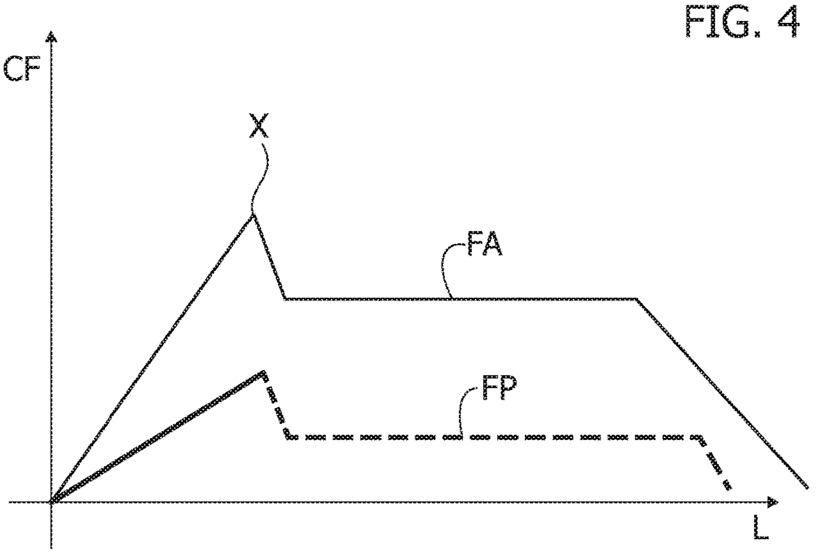
Figure 5:
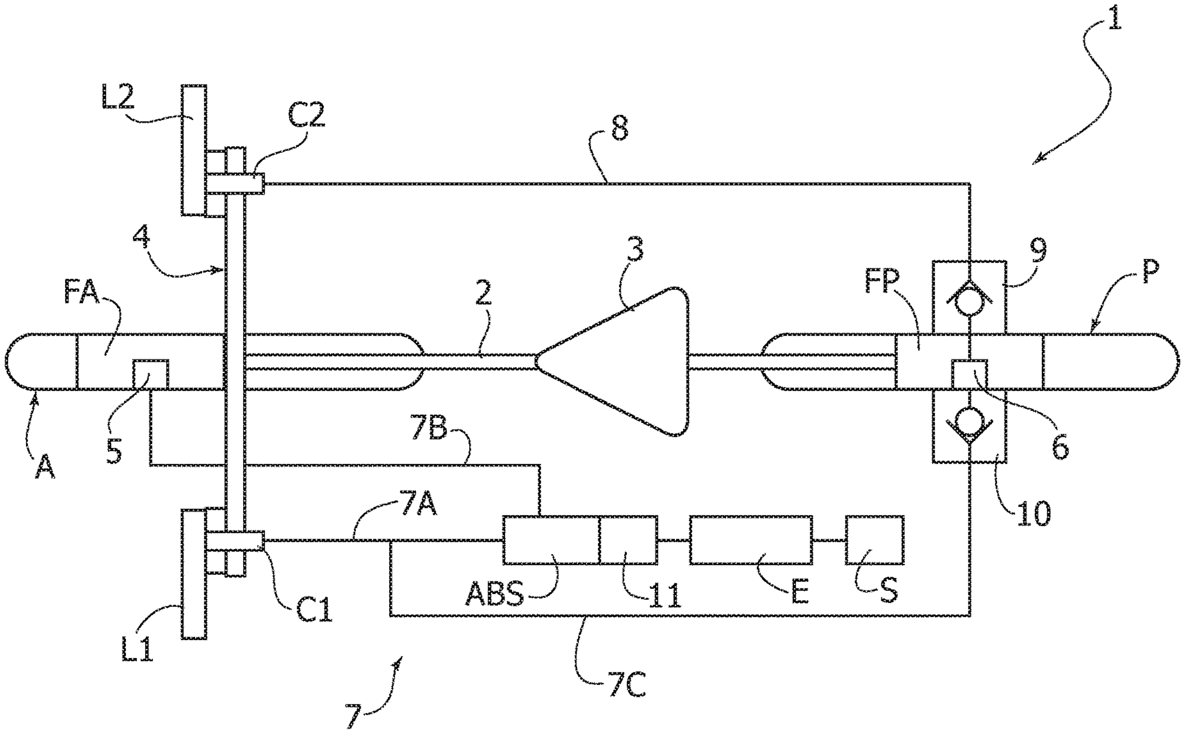
Figure 6:
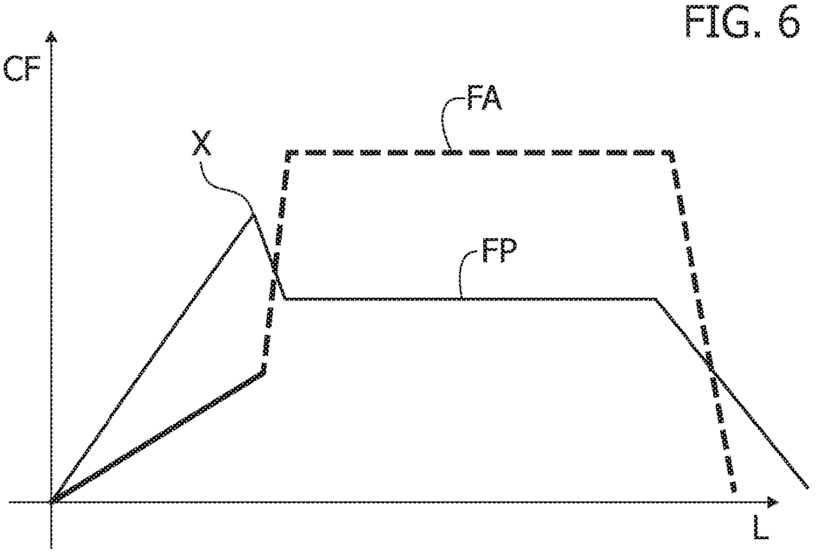
Figure 7:
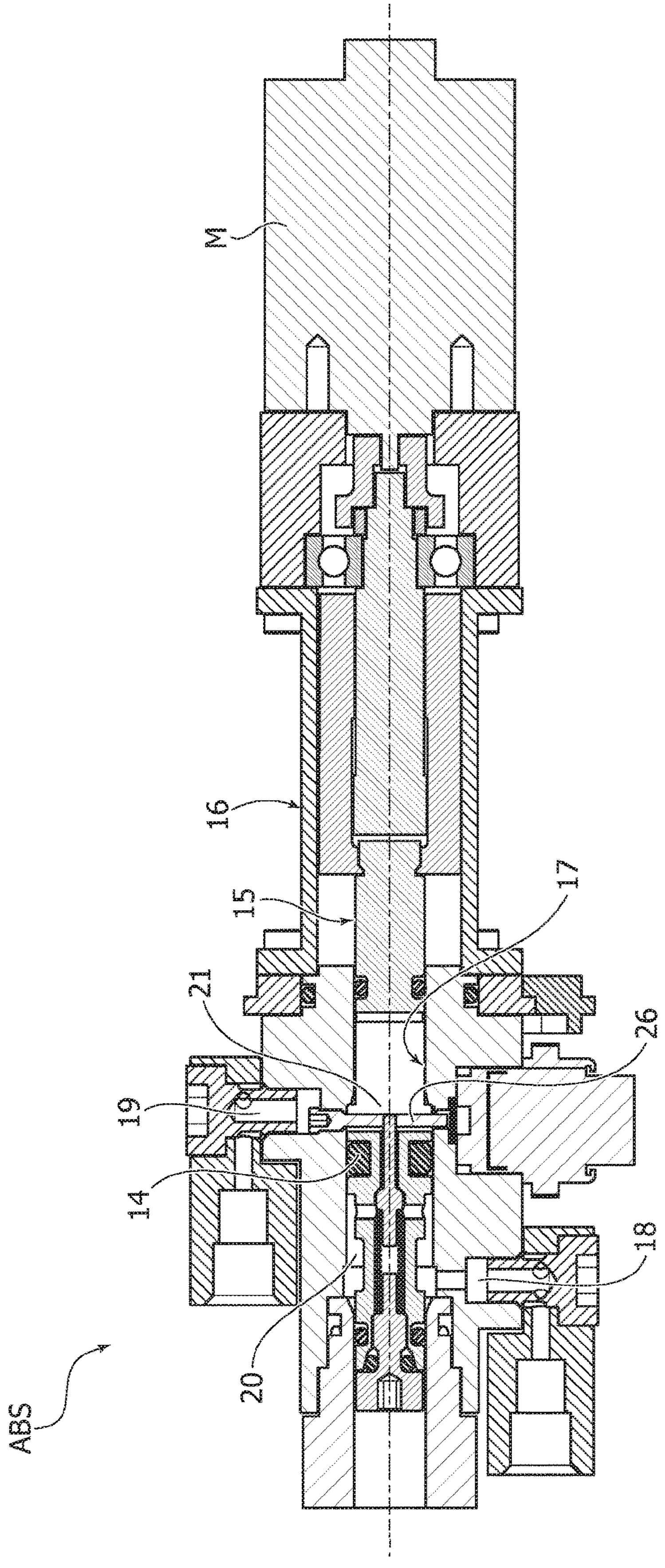
Figure 9:
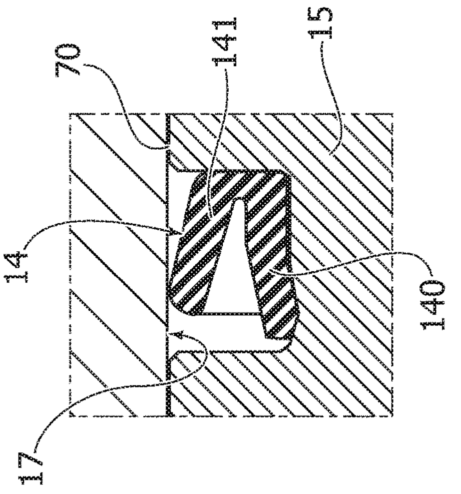
Figure 10:
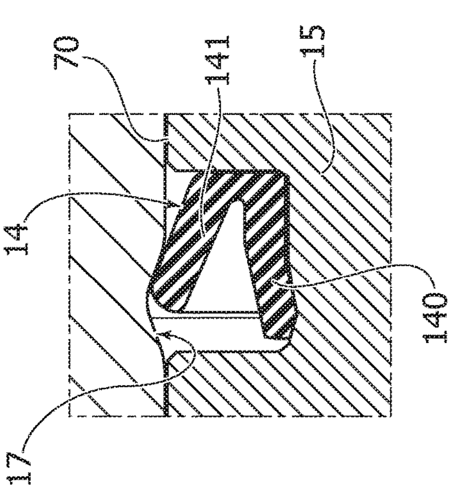
Figure 8:
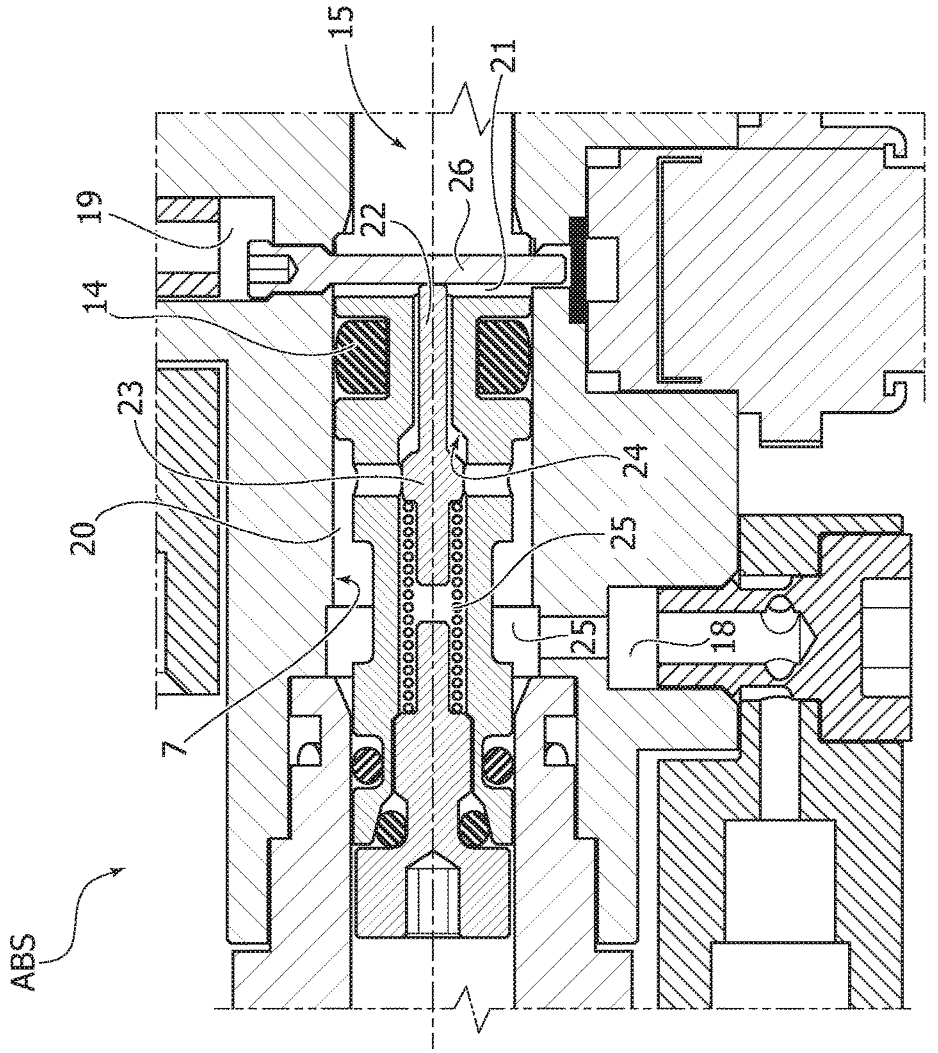

Further characteristics and advantages of the invention will become apparent from the description that follows with reference to the attached drawings, provided purely by way of non-limiting example, wherein:

FIG. 1 is a schematic view of a first embodiment of an electric bicycle equipped with a combined front brake and rear brake actuation system, FIG. 2 is a diagram illustrating the braking torque generated by the front brake and the braking torque generated by the rear brake as a function of the force exerted on the combined actuation lever of the front brake and the rear brake, FIG. 3 is a diagram of an additional embodiment wherein the combined front brake and rear brake actuation system also comprises an electrically-operated ABS device, FIG. 4 is a diagram illustrating the variation of the braking torque generated by the front brake and the braking torque generated by the rear brake, as a function of the force exerted on the main brake lever, in the case of intervention of an ABS device that controls both the front brake and the rear brake, FIG. 5 is a diagram of an additional embodiment that differs from that of FIG. 3 in that the ABS device is configured to intervene to reduce the braking action of the front brake only, FIG. 6 is a diagram illustrating the variation of the braking torque exerted by the front brake and the rear brake, as a function of the force exerted on the main brake lever, in the case of intervention of the ABS device, for the system illustrated in FIG. 5, FIG. 7 is a cross-sectional view of a preferred embodiment of the ABS device, FIG. 8 is a view on an enlarged scale of a detail of FIG. 7, FIGS. 9, 10 illustrate variants of a detail of FIG. 8.

Figure 11:
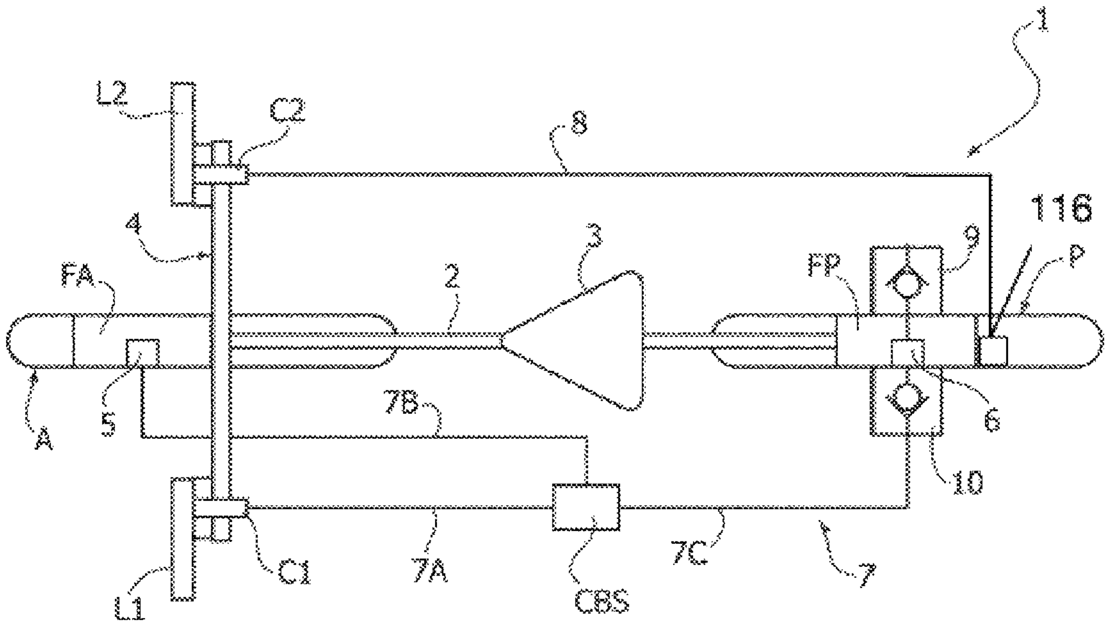

FIG. 11 is a schematic view of an embodiment of an electric bicycle equipped with a combined front brake and rear brake actuation system, FIG. 1 illustrates a schematic view of a braking system 1 associated with an electric bicycle, specifically a pedal-assisted electric bicycle. In the drawing, the references A, P indicate, respectively, the front wheel and the rear wheel of the bicycle. Reference 2 indicates the bicycle frame, with the saddle 3, and the reference 4 indicates the bicycle handlebar. Conventionally, the handlebar 4 is associated with a steering shaft rotatably mounted on the frame 2 and carrying a front fork (not illustrated) which rotates the front wheel A. The frame 2 rotates the rear wheel P and a pedal crank assembly (not shown) connected by a transmission chain (not illustrated) to the rear wheel hub. An electric motor (not illustrated) is also associated with the pedal crank assembly, configured and controlled to assist the rotation of the pedal crank assembly, in addition to the action of the cyclist.

Associated with the front wheel A is a hydraulically operated brake FA, typically a disc brake, having a hydraulic actuator 5. A hydraulically-actuated brake, typically a disc brake, having a hydraulic actuator 6 is associated with the rear wheel P. The brakes FA and FP and the respective hydraulic actuators 5, 6 are shown only schematically in the drawings, since they may be made in any known way and also because 35 they, taken alone, do not fall within the scope of the invention.

In the bicycle according to the invention, a main brake lever L1 is provided, with which a pumping hydraulic cylinder C1 is associated, which is hydraulically connected both with the hydraulic actuator 5 of the front brake and with the hydraulic actuator 6 of the rear brake, through a hydraulic circuit, indicated in its entirety with 7.

The main brake lever L1 and the respective pumping hydraulic cylinder C1 may be made in any known way and are, therefore, shown only schematically in the drawings.

In the example shown in FIG. 1, the hydraulic circuit 7 comprises a combined actuation unit of the brakes, indicated by CBS ("Combined Braking System"), which has an inlet connected via a line 7A to the hydraulic pumping cylinder C1, and two outlets connected by means of two lines 7B, 7C with the hydraulic actuators 5, 6 of the front brake and of the rear brake. The CBS unit may be made in any known way and may consist, for example, simply of a body with connecting passages between its only inlet and its two outlets, or even of a hydraulic cylinder that moves as a result of the arrival of fluid under pressure from the cylinder C1 and which transfers fluid under pressure towards its two outlets and towards the actuators 5, 6 of the front and rear brake.

Preferably, the braking system 1 is also equipped with an auxiliary brake lever L2 (which in the example is also associated with the handlebar 4) for operating the rear brake only (or an auxiliary rear brake). The lever L2 can be used, for example, in an emergency situation, in the event of a malfunction of the braking system associated with the main brake lever L1. The back-up brake lever L2 is also provided, in a per se known manner, with a pumping hydraulic cylinder C2 connected directly, via a hydraulic line 8, to the hydraulic actuator of the rear brake 6, or, alternatively, to the hydraulic actuator 116 (FIG. 11) of a second rear brake associated with the rear wheel P. The back-up brake lever L2 and the respective pumping hydraulic cylinder C2 may also be made in any known way and are, therefore, only schematically illustrated in the drawings.

During normal operation, in the event of braking by actuating the main brake lever L1, the hydraulic circuit 7 activates the front and rear brakes of the bicycle.

In a concrete embodiment, the braking system is configured in such a way that, for a given force L applied to the main operating lever L1, the value of the braking torque generated by the front brake is greater than the value of the braking torque generated by the rear brake. This characteristic is illustrated in the diagram of FIG. 2, which shows the variation of the braking torque CF generated by the front brake (line FA) and by the rear brake (line FP) as the value of the force L applied on the main brake lever L1 varies. In the example illustrated, the variations FA, FP are linear variations.

Again with reference to FIG. 1, in the hydraulic line 8 connecting the pumping hydraulic cylinder C2 of the back-up brake lever L2 and the hydraulic actuator 6 of the rear brake a one-way valve 9 is interposed, which allows the passage of fluid only in the direction of the hydraulic actuator 6. Similarly, in the hydraulic line 7C of the hydraulic circuit 7 connected and controlled by the main brake lever L1, a one-way valve 10 is interposed, which allows the passage of fluid only in the direction of the hydraulic actuator 6. Thanks to this characteristic, when the back-up brake lever L2 is operated, the risk is avoided that fluid coming from the hydraulic line 8 can rise up into the hydraulic line 7C. Similarly, when the main brake lever L1 is operated, the risk is avoided that fluid coming from the hydraulic line 7C can rise up into the hydraulic line 8 associated with the back-up brake lever L2.

FIG. 3 illustrates a second embodiment that differs from that of FIG. 1 in that the hydraulic circuit 7 associated with the main brake lever L1 comprises an electrically-controlled ABS unit that performs the function of both the combined actuation unit of the front brake and rear brake, and of ABS units.

Electrically-operated ABS devices are known and have been used for some time, also in the field of electric bicycles. In the present description, the term ABS is used according to its conventional meaning in the art, that is, with reference to an Anti-Blocking System configured to reduce the action of a brake on a wheel, for example, when during braking, the wheel tends to lock up following a loss of grip with the ground.

An electrically-operated ABS device usable in an electric bicycle is described, for example, in WO 2019/155371 A1. The same Applicant has proposed ABS devices of the type specified above, of new conception, in its international patent applications PCT/IB2021/052840 and PCT/IB2021/052845 of 06.04.2021, still secret at the priority date of this application.

In FIG. 3, the parts common to those of FIG. 1 are indicated by the same references. FIG. 3 refers to the case of an ABS device having an inlet connected via the hydraulic line 7A to the pumping hydraulic cylinder C1 of the main brake lever L1, and an outlet connected to both hydraulic lines 7B, 7C directed to the hydraulic actuators 5, 6 of the front brake and the rear brake.

As will be described in greater detail below, during normal braking caused by an intervention on the main brake lever L1, fluid under pressure is transferred from the ABS unit from line 7A to line 7B and to line 7C, causing the invention of the front brake and the rear brake. In this condition, the operation is completely similar to that of the solution illustrated in FIG. 1.

In the case of the embodiment of FIG. 3, however, the ABS unit includes an electric actuator 11 which is controlled by an electronic controller E on the basis of signals from one or more sensors S configured to detect an emergency condition, corresponding to a condition of locking a wheel and/or a condition of the bicycle tipping forward, with the rear wheel moving away from the ground.

According to a technique known per se, such sensors may be, for example, constituted by a sensor associated with the front wheel (in case it is desired to detect a locking condition of the front wheel only) and/or with the rear wheel, and configured to detect the variations in angular speed of rotation of the wheel, so as to promptly identify a condition of incipient locking. Alternatively or in addition to, sensors may be provided consisting of accelerometers, suitable for detecting vehicle deceleration beyond a determined threshold and/or sensors suitable for detecting load variations on the front wheel and on the rear wheel.

In a concrete embodiment example, the variation of the braking torque CF generated by the front brake and the rear brake, as the force L applied to the main brake lever L1 varies, is illustrated in FIG. 4, with reference to an intervention condition of the ABS unit.

In an early step of braking, when the system is far from a locked wheel or bicycle tipping condition, the braking torque CF on the front and rear wheels grows normally, similar to what was shown in FIG. 2. Upon reaching a value X of the force L applied to the main brake lever L1, the electronic controller E receives a signal from the sensors S indicative of an incipient condition of locking of the front wheel or of an incipient condition of overturning of the bicycle. In this situation, the controller E determines an activation of the actuator 11 so that the ABS unit reduces the fluid pressure supplied to the hydraulic actuators 5, 6 of the front and rear brakes. Consequently, as can be seen in FIG. 4, the braking torques applied by the front brake and the rear brake cease to increase and indeed decrease to reduced values which then remain constant.

Thanks to the characteristics described above, the system according to the invention allows a user, even if inexperienced, to simultaneously actuate the front brake and the rear brake of the bicycle while always maintaining a condition of total safety, whatever the operating condition of the bicycle. i.e. whatever the speed of the bicycle, for example, the force applied on the main brake lever L1, whatever the conditions of adhesion of the wheels on the ground and whatever the load transfer on the front wheel during braking and the lightening of the load on the rear wheel when braking.

FIG. 5 illustrates another embodiment that differs from that of FIG. 3 only in that the ABS unit has its outlet connected only to the hydraulic line 7B for operating the hydraulic actuator 5 of the front brake. In this embodiment, the hydraulic actuator 6 of the rear brake is connected through the line 7C directly to the line 7A of the pumping hydraulic cylinder C1.

In this case, braking wherein the ABS unit intervenes leads to a decrease in braking torque on the front brake FA only, as shown in the diagram in FIG. 6. When the limit condition X is reached, the braking torque CF on the front brake FA is reduced, while the hydraulic actuator 6 of the rear brake FP continues to receive fluid under pressure without any reduction in pressure, so that the braking torque CF of the rear brake FP also increases after the intervention point X of the ABS unit, up to a possible locking of the rear wheel, which determines a constant variation of the braking torque on the rear brake FP as the force L exerted on the main brake lever L1 varies. Locking the rear wheel is not harmful, as it ensures that the front wheel does not lose grip with the ground, thanks to the intervention of the ABS unit.

In a preferred embodiment, the ABS unit, both in the case of connection with both the front and rear brakes (FIG. 3) and in the case of connection only with the front brake (FIG. 5), can be made according to the example illustrated in the FIGS. 7, 8, which corresponds to a solution proposed in the patent international application PCT/IB2021/052840 by the same Applicant, still secret at the priority date of the present invention.

With reference to these figures, the ABS unit comprises a body 16 defining an inner cavity 17 and having an inlet opening 18 and an outlet opening 19 communicating with the cavity 7. A floating member 15 is slidably mounted within the inner cavity 17 of the body 6. On the floating member is mounted a main sealing ring 14, which is in engagement against the wall of the inner cavity 17, so as to define an upstream chamber 20 within the cavity 7, communicating with the inlet opening 18 and a downstream chamber 21, communicating with the outlet opening 19.

As already indicated above, the inlet opening 18 of the ABS unit is hydraulically connected to the pumping cylinder C1 of the main brake lever L1, while the outlet opening 9 is hydraulically connected to the hydraulic actuators 5,6 of the front brake and of the rear brake (in the case of the solution in FIG. 3), or only with the hydraulic actuator 5 of the front brake (in the case of the solution in FIG. 5).

As better visible in FIG. 8, a passage 22 is formed in the body of the floating member 15 for the hydraulic communication between the upstream chamber 20 and the downstream chamber 21. The passage 22 is controlled by a valve member 23, which cooperates with a valve seat 24 formed in the body of the floating member 15. Associated with the valve member 23 is at least one spring 25, which tends to keep the valve member 23 in engagement against the valve seat 24, in a closed position wherein the hydraulic communication between the upstream chamber 20 and the downstream chamber 21.

With reference to FIG. 7, the ABS unit further comprises an electric actuator (corresponding to the actuator 11 in FIGS. 3,5) in the form of an electric motor M, configured to control the position of the floating member 15 within the cavity 17 of the ABS unit.

During normal braking, the electric motor M is inactive and the floating member 15 is in an stroke-end position in the direction of the downstream chamber 21, wherein the valve member 23 of the floating member 15 interacts with an abutment element 26 of the body 16 of the ABS unit (in the specific case a transverse pin), which keeps the valve member 23 in an open position, spaced apart from the valve seat 24, against the action of the spring 25. Therefore, during normal braking, the fluid pumped by the pumping cylinder C1 can flow from the inlet opening 18 to the outlet opening 19 in the direction of both the hydraulic actuators of the front brake and the rear brake (in the case of the solution of FIG. 3) or only the hydraulic actuator of the front brake (in the case of the solution of FIG. 5).

If, on the other hand, the electronic controller E receives a signal indicating the need for intervention of the ABS unit, the electronic control E activates the electric motor M, which commands a movement of the floating member 15 in the direction of the upstream chamber 20 and away from the aforesaid stroke-end position (i.e. towards the left with reference to FIGS. 7,8), so that the valve member 23 is brought into its closed position by the spring 25, so as to interrupt the communication between the upstream chamber 20 and the downstream chamber 21. In this condition, the downstream chamber 21 increases in volume, generating a decrease in the pressure of the fluid supplied to the ABS unit.

Furthermore, the ABS unit comprises a valve device configured to open the communication between the upstream chamber 20 and the downstream chamber 21 in any condition wherein the pressure of the downstream chamber 21 becomes greater than the pressure of the upstream chamber 20 due to a differential higher than a predetermined threshold.

In the case of the example illustrated in FIGS. 7, 8 this result is always guaranteed by the same valve member 23. When the floating member 15 is moved away from its stroke-end position and the valve member 23 is in its closed position, in contact with the valve seat 24, the valve member in any case has a surface exposed to the environment. of the downstream chamber 21, so that an overpressure in the downstream chamber 21 causes an opening of the valve member 23, against the action of the spring 25.

As an alternative to this solution, a lip configuration of the type illustrated in FIG. 9 can be provided for the main seal ring 14. In this case, the sealing ring 14 has a portion 140 secured within a circumferential groove of the body of the floating member 15, and an outer circumferential lip 141, which is in contact with the wall of the cavity 7. The groove wherein the sealing ring 14 is received is—in any case—always in communication with the environment of the downstream chamber 21 through an annular gap 70 defined between the outer surface of the floating member 15 and the wall of the cavity 7. The sealing lip 141, therefore, controls the communication between the downstream chamber 21 and the upstream chamber 20. In the event of overpressure in the downstream chamber 21, the circumferential lip 141 deforms radially inwards, putting the chambers 20, 21 in communication.

FIG. 10 illustrates another variant, which corresponds to a solution that has formed the subject of the international patent application PCT/IB2021/052840 by the same Applicant, still secret at the priority date of the present invention. In this case, the sealing ring, which may be of the conventional type illustrated in FIG. 8, or of the circumferential lip type of the type illustrated in FIG. 9 and in FIG. 10 itself, cooperates with a portion of the inner wall of the cavity 7 shaped in such a way that when the floating member 15 moves away from its stroke-end position illustrated in FIG. 8, i.e. it moves to the left (with reference to the drawings), towards the upstream chamber 20, the sealing ring 14 loses the contact with the wall of the cavity 7, so that it puts the upstream chamber in communication with the downstream chamber. In this way, the sealing ring 14 is able to perform the function that in the solution of FIGS. 7, 8 is performed by the valve member 23. In other words, in the case of the solution in FIG. 10, the floating member 15 can be devoid of the inner passage 22 and the valve member 23.

Of course, without prejudice to the principle of the invention, the details of construction and the embodiments may vary widely with respect to those described and illustrated purely by way of example, without departing from the scope of the present invention.

The invention claimed is:

1. An electric bicycle comprising:

a front wheel and a rear wheel, and a braking system comprising:

a front brake associated with the front wheel and provided with a front hydraulic actuator, a rear brake associated with the rear wheel and provided with a rear hydraulic actuator, wherein the braking system further comprises a main brake lever for combined actuation of the front brake and the rear brake, with which a main hydraulic pumping cylinder is associated, and a hydraulic connecting circuit that operatively connects the main hydraulic pumping cylinder of the main brake lever with the front hydraulic actuator of the front brake and with the rear hydraulic actuator of the rear brake, wherein the braking system further comprises a back-up brake lever, with which a rear pumping hydraulic cylinder is associated, and a rear pumping hydraulic line operatively connecting the rear pumping hydraulic cylinder of the back-up brake lever only with the rear hydraulic actuator of the rear brake or only with an auxiliary hydraulic actuator associated with an auxiliary rear brake, an electrically-operated ABS device, interposed in the hydraulic connection between the main hydraulic pumping cylinder of the main brake lever and at least the hydraulic actuator of the front brake, said ABS device being configured to decrease the fluid pressure supplied to said front hydraulic actuator of the front brake during a braking controlled by said main brake lever, one or more sensors configured to detect, during braking of the electric bicycle, a tendency of at least one of the front wheel to lock or a tendency of the rear wheel to lose contact with the ground, and an electronic controller programmed to activate the ABS device upon receipt of a signal from said one or more sensors, and the rear pumping hydraulic line that connects the rear pumping hydraulic cylinder of the back-up brake lever with the rear hydraulic actuator of the rear brake comprises a first one-way valve therein, said one-way valve allowing a passage of fluid only in a direction from the rear pumping hydraulic cylinder toward the rear hydraulic actuator of the rear brake, while in the hydraulic line that connects the main pumping hydraulic cylinder of the main brake lever or the ABS device, with the rear hydraulic actuator of the rear brake, a second one-way valve is interposed, which allows a passage of fluid only in a direction from the front pumping hydraulic cylinder toward the rear hydraulic actuator of the rear brake.

2. An electric bicycle according to claim 1, wherein said electrically-operated ABS device-is interposed in the hydraulic connection between the main pumping hydraulic cylinder of the main brake lever and the rear hydraulic actuator of the rear brake, and is configured to decrease the fluid pressure supplied, both to said front hydraulic actuator of the front brake, and to said rear hydraulic actuator of the rear brake during braking controlled by said main brake lever, in the event that at least one of a tendency of the front wheel to lock or a tendency of the rear wheel to lose contact with the ground is detected.

3. An electric bicycle according to claim 1, wherein said braking system is configured in such a way that for each value of the force applied to said main brake lever, the braking torque generated by said front brake is greater than the braking torque generated by said rear brake.

4. An electric bicycle according to claim 1, wherein said ABS device comprises:

a body, defining an inner cavity, and having an inlet opening and an outlet opening communicating with said cavity, a floating member, slidably mounted within the inner cavity of the body, a main sealing ring, mounted on the floating member and engaged on the wall of said inner cavity, so as to define an upstream chamber within said cavity, which communicates with said inlet opening, and a downstream chamber communicating with said outlet opening, wherein said inlet opening is hydraulically connected to the pumping hydraulic cylinder of the main brake lever, while said outlet opening is hydraulically connected at least to the hydraulic actuator of the front brake, said floating member having a body with a passage for hydraulic communication between said upstream chamber and said downstream chamber, and being provided with a valve member that cooperates with a valve seat formed in the body of the floating member, for controlling said hydraulic communication through said passage, wherein said valve member is associated with at least one spring tending to keep the valve member engaged against said valve seat, in a closed position wherein the hydraulic communication between said upstream chamber and said downstream chamber is interrupted, said ABS device further comprising an electric motor configured to control the position of the floating member within the cavity of the body, in such a way that:

during a normal braking, said electric motor is inactive and said floating member is at a stroke-end position in the direction of the downstream chamber, wherein the valve member of the floating member interacts with an abutment element of the body, which holds the valve member in an open position, spaced apart from said valve seat, against the action of said at least one spring, so that during a normal braking, the fluid pumped by the pumping device of the main operating lever can flow from said inlet opening to said outlet opening, in the direction at least of the hydraulic actuator of the front hydraulic brake of the bicycle, while in conditions that require the activation of the ABS, said electric motor is configured to be activated and to cause a movement of the floating member in the direction of said upstream chamber and away from said stroke-end position, so that the valve member is brought into its closed position by said at least one spring, so as to interrupt the communication between the upstream chamber and the downstream chamber, and so that the downstream chamber increases in volume and generating a decrease in the pressure of the fluid supplied to the hydraulic actuator of the front brake, wherein said ABS device further comprises a valve device configured to open the communication between the upstream chamber and the downstream chamber when the pressure in the downstream chamber becomes greater than the pressure in the upstream chamber by a differential higher than a predetermined threshold.

5. An electric bicycle according to claim 4, wherein said outlet opening of the ABS device is hydraulically connected only with the hydraulic actuator of the front brake.

6. An electric bicycle according to claim 4, wherein said outlet opening of the ABS device is hydraulically connected both with the hydraulic actuator of the front brake, and with the hydraulic actuator of the rear brake.

7. An electric scooter, with a front wheel and a rear wheel and a braking system as indicated in claim 1.

8. An electric bicycle according to claim 1 wherein the ABS device is configured to decrease the fluid pressure supplied to said front hydraulic actuator of the front brake during a braking controlled by said main brake lever when a tendency of the front wheel to lock is detected.

9. An electric bicycle according to claim 1 wherein the ABS device is configured to decrease the fluid pressure supplied to said front hydraulic actuator of the front brake during a braking controlled by said main brake lever when a tendency of the rear wheel to lose contact with the ground is detected.

10. An electric bicycle according to claim 1 wherein the one or more sensors is configured to detect, during braking of the electric bicycle, a tendency the front wheel to lock.

11. An electric bicycle according to claim 1 wherein the one or more sensors is configured to detect, during braking of the electric bicycle, a tendency of the rear wheel to lose contact with the ground.

* * * * *